| United States Patent [19] | [11] Patent Number: 4,818,803 |
| Harris | [45] Date of Patent: Apr. 4, 1989 |

[54] POLY(ARYL ETHER SULFONE) COMPOSITIONS HAVING IMPROVED FLOW PROPERTIES

[75] Inventor: James E. Harris, Piscataway, N.J.

[73] Assignee: Amoco Corporation, Chicago, Ill.

[21] Appl. No.: 78,460

[22] Filed: Jul. 27, 1987

[51] Int. Cl.[4] ..................... C08G 65/48; C08L 71/04
[52] U.S. Cl. ................................... 525/390; 525/535
[58] Field of Search ............ 528/125, 126, 128, 174, 528/219; 525/390, 535

[56] References Cited

U.S. PATENT DOCUMENTS 4,169,178  9/1979  Freeman ........................ 528/126
4,358,569 11/1982  Quinn et al. ................... 525/439
4,520,067  5/1985  Harris et al. .................. 428/323

*Primary Examiner*—John Kight
*Assistant Examiner*—M. L. Moore
*Attorney, Agent, or Firm*—Janice M. McLain; William H. Magidson; Ralph C. Medhurst

[57] ABSTRACT

Described herein are poly(aryl ether sulfone) blends possessing improved flow properties. The novel compositions contain (a) from about 80 to about 99 percent by weight of a poly(aryl ether sulfone) having a second order glass transition temperature (Tg) higher than about 230° C., and (b) from about 1 to about 20 percent by weight of a second poly(aryl ether sulfone) having a Tg below about 230° C. The compositions described herein retain the very attractive characteristics of their constituents, and display excellent mechanical properties and heat resistance.

10 Claims, No Drawings

POLY(ARYL ETHER SULFONE) COMPOSITIONS HAVING IMPROVED FLOW PROPERTIES

FIELD OF THE INVENTION

This invention is directed to poly(aryl ether sulfone) blends possessing improved flow properties. The novel compositions contain (a) from about 80 to about 99 percent by weight of a poly(aryl ether sulfone) having a second order glass transition temperature (Tg) higher than about 230° C., and (b) from about 1 to about 20 percent by weight of a second poly(aryl ether sulfone) having a Tg below about 230° C. The compositions described herein retain the very attractive characteristics of their constituents, and display excellent mechanical properties and heat resistance.

BACKGROUND OF THE INVENTION

Poly(aryl ether sulfones) have been known for about two decades; they are tough linear polymers that possess a number of attractive features such as excellent high temperature resistance, good electrical properties, and very good hydrolytic stability. Two poly(aryl ether sulfones) are commercially available. A poly(aryl ether sulfone) is available from Imperial Chemical Industries Limited. It has the formula (1)

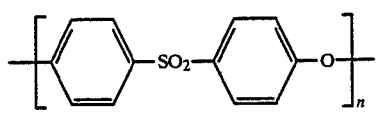

(1)

and is produced by polycondensation of 4-(4'-chlorophenylsulfonyl)phenol, as described in British Patent Specification No. 1,153,035. The polymer contains no aliphatic moieties and has a heat deflection temperature of approximately 210° C. Another commercial poly(aryl ether) is available from Amoco Performance Products, Inc. under the trademark UDEL. It corresponds to formula (2) and has a heat deflection temperature of about 180° C.

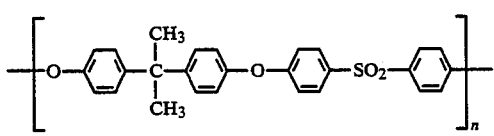

(2)

Polymer (2) is prepared via the nucleophilic polycondensation reaction of 2,2-bis(4-hydroxy-phenyl)propane ("bisphenol-A") with 4,4'-dichlorodiphenyl sulfone. This method, described by Johnson et al., Journal of Polymer Science, A-1, Vol. 5, 1967, pp. 2415–2427, and Johnson et al., U.S. Pat. Nos. 4,107,837 and 4,175,175, has been shown to be quite general and applicable for the synthesis of a broad range of other poly(aryl ether sulfones) (hereinafter called PAE's). Using this approach, a host of PAE's having wide ranging properties was prepared.

Materials (1) and (2) display relatively low glass-transition and, hence, low heat distortion temperatures. The drawback is serious, since it makes the two polymers unsuitable in applications where a high Tg is important. Such applications include, for example, the area of composites which often require a matrix capable of maintaining structural integrity at relatively high temperatures. Thus, over the years, numerous poly(aryl ether sulfones) having high Tg's have been prepared. Of particular interest among these latter polymers are those containing the 4,4'-bis-(phenylsulfonyl)biphenyl units (3):

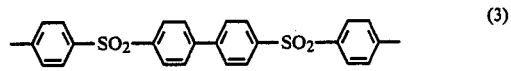

(3)

Thus, U.S. Pat. No. 3,647,751 depicts polymers of formula (4):

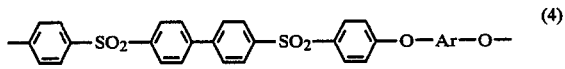

(4)

wherein Ar is defined as a diphenylene or naphthylene radical or a polynuclear divalent radical of the formula:

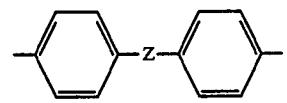

where Z is a divalent aliphatic, cycloaliphatic or arylaliphatic radical containing 1 to 8 carbon atoms or —O—, —S—, —SO—, —SO$_2$—, or —CO—.

U.S. Pat. No. 3,634,355 describes a number of polymers prepared from 4,4'-bis(4-chlorophenylsulphonyl)-biphenyl (5).

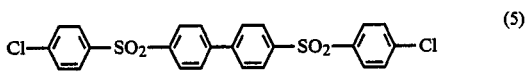

(5)

For instance, in Example 5 the following polymer is provided:

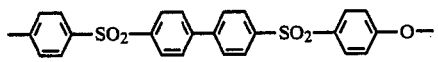

Example 16 depicts the polymer containing units (6) and (7) is a 4:1 molar ratio.

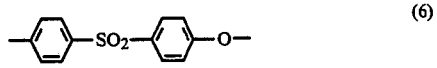

(6)

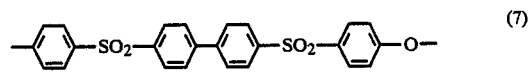

(7)

Example 17 shows the same structure, except that units (6) and (7) are present in a 1:1 ratio.

The homopolymer (7) is described in U.S. Pat. No. 4,009,149.

Copolymers containing units (3) are also the subject of two patent applications (U.S. Ser. Nos. 701,234 and 701,306), both filed on Feb. 13, 1985 in the names of James Elmer Harris, Louis Michael Maresca and Markus Matzner, both titled "Polyaryl Ether Sulfone Polymers", and both commonly assigned.

Other poly(aryl ether sulfones) displaying high glass transition temperatures are, for example, those containing terphenylene, naphthylene, anthracenylene and fluorene-9,9-bis(phenylene) units (8):

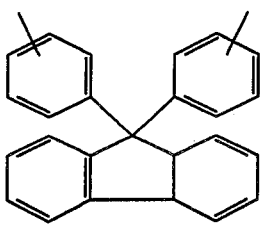
(8)

The above listed high Tg materials have generally high melt viscosities and are difficult to melt-fabricate. The development of compositions with improved melt flow properties and better melt-fabricability based on the aforementioned high Tg poly(aryl ether sulfones) is, therefore, of great practical importance. It is, of course, necessary that the novel compositions retain the attractive features of the original polymers. Products satisfying the above listed criteria are the subject of the instant invention.

DESCRIPTION OF THE INVENTION

It was now unexpectedly discovered that blends containing (a) from about 80 to about 99 percent by weight, preferably from about 85 to about 98 percent by weight, of a poly(aryl ether sulfone) having a second order glass transition temperature (Tg) higher than about 230° C., and (b) from about 1 to about 20 percent by weight preferably from about 2 to about 15 percent by weight of a second poly(aryl ether sulfone) having a Tg below about 230° C., display vastly improved melt-flow properties. It is unexpected that the compositions retain the excellent mechanical properties of the constituents. Moreover, the heat distortion temperature of the high Tg material remains practically unaffected by the addition of the lower Tg polymer.

It is preferred that the two poly(aryl ether sulfones) be immiscible.

The poly(aryl ether sulfones) having second order glass transition temperatures greater than about 230° C. are based on the monomers of formula (9) where X is a halogen, preferably chlorine or fluorine, or a hydroxyl group; Ar is a divalent aromatic radical selected from the group of

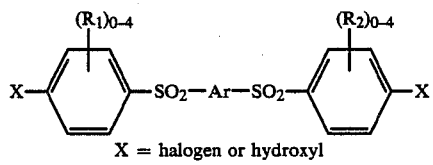

X = halogen or hydroxyl biphenylene (10), terphenylene (11), naphthylene (12), anthracenylene (13), and fluorene-9,9-bis(phenylene) (8);

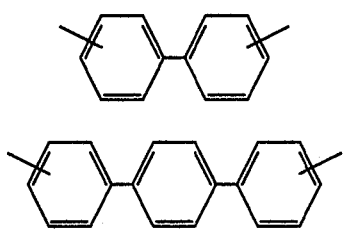

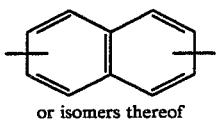
(12)

or isomers thereof

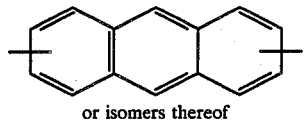
(13)

or isomers thereof

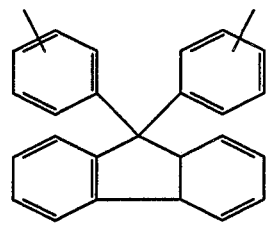
(8)

$R_1$ and $R_2$ are inert substituents such as $C_1$ to $C_4$ alkyl or alkoxy groups; they can be the same or different.

The high Tg poly(aryl ether sulfones) can be prepared by the nucleophilic polycondensation of (9) (X=halogen) with a dihydric phenol; the latter may be the dihydroxy variant of (9) (X=OH) or any other dihydric phenol or a mixture of these materials. Conversely, these high Tg polymers may be prepared by the nucleophilic polycondensation of (9) (X=OH) with any activated dihalobenzenoid compound or mixtures thereof. Note, that the base-catalyzed self-condensation of (14), where X is a halogen, is yet another route to the homopolymer (15).

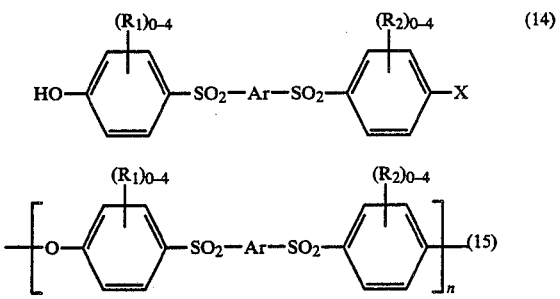

The nucleophilic polycondensation of (14) with a dihydric phenol and an activated dihalobenzenoid compound, offers an additional route to these high Tg products. For the purposes of this invention it is essential that the high Tg materials contain at least 50 mole percent of units (15).

The dihydric phenols useful in the instant invention are preferably weakly acidic dinuclear phenols such as, for example, the dihydroxy-diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as for example, ether oxygen (-O-), carbonyl

sulfone

or hydrocarbon residue in which the two phenolic nuclei are joined to the same or different carbon atoms of the residue.

Such dinuclear phenols can be characterized as having the structure:

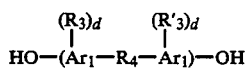

wherein $Ar_1$ is an aromatic group and preferably is a phenylene group; $R_3$ and $R'_3$ can be the same or different inert substituent groups such as alkyl groups having from 1 to 4 carbon atoms, aryl, halogen atoms, i.e., fluorine, chlorine, bromine or iodine, or alkoxy radicals having from 1 to 4 carbon atoms; the d's are independently integers having a value of from 0 to 4, inclusive; and $R_4$ is representative of a bond between aromatic carbon atoms as in dihydroxy-diphenyl, or is a divalent radical, including for example, radicals such as

—O—, —S—, —S—S—, —SO—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and radicals fused to both $Ar_1$ groups.

Examples of specific dihydric polynuclear phenols include, among others, the bis-(hydroxyphenyl)alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)-methane
1,1-bis-(4-hydroxyphenyl)ethane
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane
2,2 -bis-(4-hydroxyphenyl)1,1;1,2;3,3,-hexafluoropropane and the like;
di(hydroxyphenyl)sulfones such as
bis-(4-hydroxyphenyl)sulfone,
2,4'-dihydroxydiphenyl sulfone,
5-chloro-2,4'-dihydroxydiphenyl sulfone,
5'-chloro-4,4'-dihydroxydiphenyl sulfone, and the like;
di(hydroxyphenyl)ethers such as
bis-(4-hydroxyphenyl)ether,
the 4,3'-; 4,2'-; 2,2'-; 2,3'-dihydroxyphenyl ethers,
4,4'-dihydroxy-2,6-dimethyldiphenyl ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxy-3,6-dimethoxydiphenyl ether.

Other useful diphenols are, for example, the naphthalenediols and the mononuclear diphenols such as hydroquinone or resorcinol. Dihydroxybiphenyls, such as 4,4'-biphenol, are also very useful.

In addition to the activated dihalobenzenoid compounds, dinitrobenzenoid compounds are also suitable for the purposes of the instant invention. Any dihalobenzenoid or dinitrobenzenoid compound or mixtures thereof can be employed in this invention which compound or compounds has the two halogens or nitrogroups bonded to benzene rings having an electron withdrawing group in at least one of the positions ortho or para to the halogen or nitro group. The dihalobenzenoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1 percent and preferably below 0.5 percent for best results.

An electron withdrawing group is employed as the activator group in these compounds. It should be, of course, inert under the reaction conditions, but otherwise its structure is not critical. Preferred are the strongly activating groups such as the sulfone group

bonding two halogen or nitro-substituted benzenoid nuclei, as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:
(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.
(b) divalent groups which can activate displacement of halogens on two different rings, such as the sulfone group

the carbonyl group

the vinylene group

the sulfoxide group

the azo group —N=N—; the saturated fluorocarbon groups

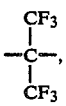

CF$_2$—CF$_2$CF$_2$; organic phosphine oxides

where R''$_3$ is a hydrocarbon group and the ethylidene group

where A can be hydrogen or halogen.

The polyarylene polyether polymers of this invention are prepared by methods well known in the art as for instance the one-step reaction of a double alkali metal salt of a dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with the dihalobenzenoid or dinitrobenzenoid compound.

Additionally, the polyethers may be prepared by the procedure described in, for example, U.S. Pat. No. 4,176,222 in which at least one bisphenol and at least one dihalobenzenoid compound are heated at a temperature of from about 100° to about 400° C. with a mixture of sodium carbonate or bicarbonate and a second alkali metal carbonate or bicarbonate having a higher atomic number than that of sodium.

Further, the polyethers may be prepared by the procedures described in Canadian Patent No. 847,963 wherein the bisphenol and dihalobenzenoid compound are heated in the presence of potassium carbonate using a high boiling solvent such as diphenylsulfone.

Halophenols or nitrophenols wherein the halogen or nitro group is activated by an electron withdrawing group in the ortho- and/or para positions can also be used for the preparation of the poly(aryl ether sulfones). The halophenols or nitrophenols can be used alone or in conjunction with a diphenol and a dihalo- or dinitrobenzenoid compound as defined above.

While the preparation of the high Tg poly(aryl ether sulfones) via the nucleophilic route is preferred, these materials may also be made via electrophilic (Friedel-Crafts) processes. These processes have been described in, for example, U.S. Pat. Nos. 3,773,720; 3,321,449; 3,406,149; and 4,008,203; and in British Pat. No. 1,060,546. A typical example is shown in Equation (I):

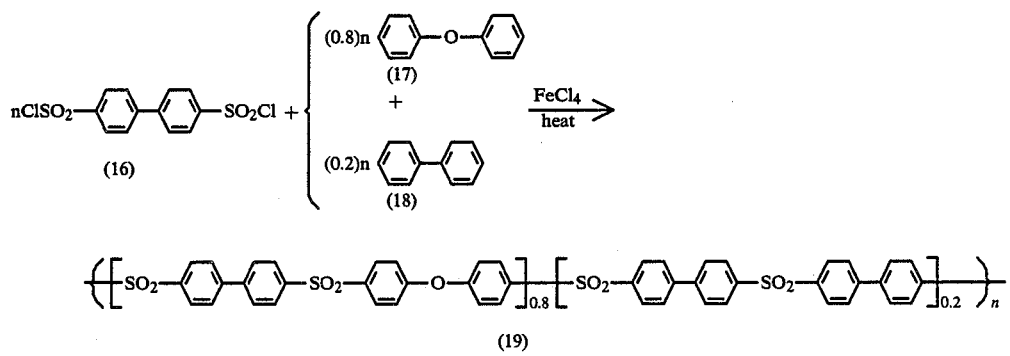

The electrophilic polymerizations are performed in the presence of typical Friedel-Crafts catalysts such as ferric chloride, aluminum chloride, ferric bromide, boron trifluoride, and the like. A variety of solvents such as chlorinated hydrocarbons, nitrobenzene, arochlor, dimethyl sulfone, etc. are useful. Temperatures of up to 250° C., and even higher are preferably employed when high molecular weight polymers are desired.

The preferred high Tg poly(aryl ether sulfones) are (19), and those based of (5) and the dihydric phenols (20), (21), (22), (23), and (24).

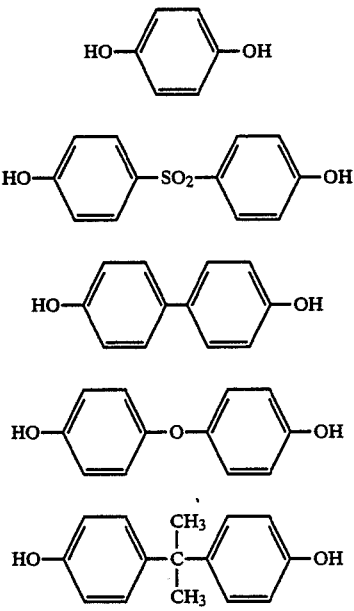

The poly(aryl ether sulfones) having second order glass transition temperatures below about 230° C. are obtained by the nucleophilic polycondensation of 4,4'-dichlorodiphenyl sulfone (25) with

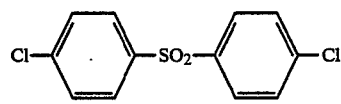

bisphenols of the formula (26):

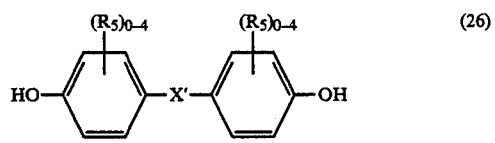

wherein X' is selected from the group of hydrocarbon radicals such as alkylene and alkylidene radicals having up to and inclusive 8 carbon atoms, cycloalkylene and cycloalkylidene radicals having up to and inclusive 9 carbon atoms, S, CO, and the radicals

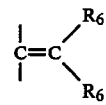

the $R_5$'s are $C_1$ to $C_4$ alkyl or alkoxy radicals or halogen atoms and can be the same or different; the $R_6$'s are hydrogen or $C_1$ to $C_4$ alkyl radicals or halogen atoms; they can be the same or different.

The low Tg poly(aryl ether sulfones) are prepared using methods that are similar to those used for the preparation of their high Tg counterparts.

The preferred low Tg poly(aryl ether sulfone) is represented by formula (2).

The compositions of this invention are prepared by any conventional mixing method. For example, a preferred method comprises mixing the two poly(aryl ether sulfones) in powder or granular form in an extruder and extruding the mixture into strands, chopping the strands into pellets and molding the pellets into the desired article.

The compositions of this invention may include mineral fillers such as carbonates including chalk, calcite and dolomite; silicates including mica, talc, wollastonite, silicon dioxide; glass spheres; glass powders; aluminum; clay; quartz; and the like. Also, reinforcing fibers such as fiberglass, carbon fibers, and the like may be used. The compositions may also include additives such as titanium dioxide; thermal stabilizers, ultraviolet light stabilizers, plasticizers, and the like.

The compositions of this invention may be fabricated into any desired shape, i.e., moldings coatings, films, or fibers. They are particularly desirable for use as electrical insulation for electrical conductors.

EXAMPLES

The following examples serve to give specific illustrations of the practice of this invention but they are not intended in any way to limit the scope of this invention.

CONTROL A

A poly(aryl ether sulfone) random terpolymer of the following structure

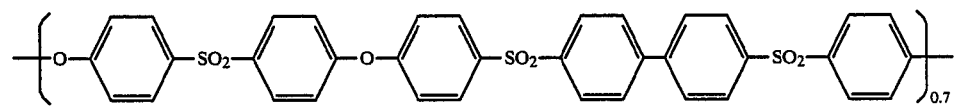

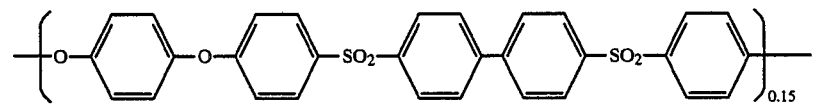

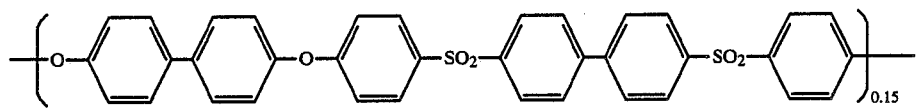

was prepared as described below. Into a 500 ml flask provided with a stirrer, nitrogen inlet tube, thermometer, reflux condenser with a Dean-Stark trap and a dropping funnel were placed:
45.31 g (0.09 moles) of 4,4'-bis(p-chlorophenylsulfonyl)-biphenyl,

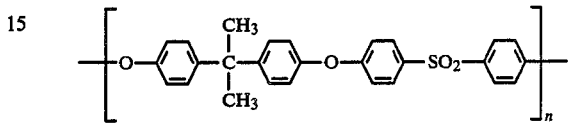

15.77 g (0.063 moles) of 4,4'-dihydroxydiphenyl sulfone,
1.49 g (0.0135 moles) of hydroquinone,
2.51 g (0.0135 moles) of 4,4'-biphenol,
14.93 g (0.108 moles) of potassium carbonate, and
110.00 g of sulfolane.

A nitrogen atmosphere was maintained throughout the reaction. A small amount of monochlorobenzene (MCB) was added and heating and stirring were begun. When the temperature reached about 145° C., the MCB started to distil entraining the water formed. A dropwise addition of MCB was maintained to replace the chlorobenzene which was distilling out. After about 1.25 hours, the temperature reached 190°–210° C.; it was maintained at that level for about 4 hours. Cooling was then begun. 55 g of MCB and 0.25 g of NaOH were added when the temperature reached 130° C. At 120° C., bubbling of CH$_3$Cl (to end-cap the polymer) was begun and continued for 0.5 hours. 90 ml of MCB were then added and the reaction mixture was cooled to room temperature.

The mixture was filtered and the filtrate was coagulated in excess methanol. The obtained polymer was dried until constant weight; its reduced viscosity (RV) was 0.5 dl/g (0.2 g/100 ml; 25° C., N-methylpyrrolidone).

The material was fluxed in a Brabender Plasticorder mixer at 360° C. for about 5 minutes. The melt flow index of the copolymer at 380° C. and 44 psi was measured according to ASTM D1238 and is given in Table I. The copolymer resin was placed in a 4×4×0.020-inch cavity mold and compression molded in a South Bend hydraulic press whose jaws had been electrically heated to about 375° C. The 0.020-inch thick compression molded sheet was shear cut into one-eighth inch wide strips. The heat deflection temperature at 264 psi (ASTM D648) was estimated as follows:

The modulus-temperature curve and Tg were measured for specimens shear cut from the compression molded sheet according to the method described in Olabisi, et al., *Polymer-Polymer Miscibility*, Academic Press, NY, page 126. The HDT was taken as the temperature at which the tensile modulus dropped to 100,000 psi as described by M. T. Takemori, Soc. Plastics Eng., Proceedings of 36th ANTEC Conf., April 1978, pp. 216–219. The Tg and HDT are given in Table I.

EXAMPLE 1

85 weight percent of the poly(aryl ether sulfone) of Control A was mixed with 15 weight percent of polysulfone with a Tg of 185° C. of the structure

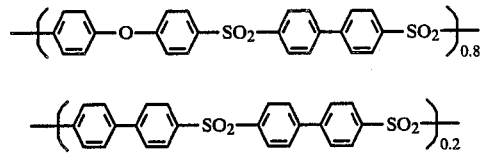

(UDEL P3703 obtained from Amoco Performance Products, Inc.) in a Brabender Plasticorder mixer at 360° C. for about 5 minutes. The blend was molded and tested as in Control A. The results are shown in Table I. The blend is immiscible as can be deduced from the existence of two Tg's. It is remarkable that the HDT remains unchanged even though the melt flow index was increased by a factor greater than two.

CONTROL B

A poly(aryl ether sulfone) random copolymer of the structure

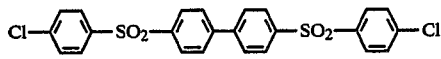

(Astrel 360 obtained from 3M Corporation) was fluxed in a Brabender Plasticorder at about 360° C. for about 5 minutes. The resin was molded and tested as in Control A. The results are given in Table I.

EXAMPLE 2

85 weight percent of the poly(aryl ether sulfone) of Control B was mixed with 15 weight percent of polysulfone with a Tg of 185° C. of the structure

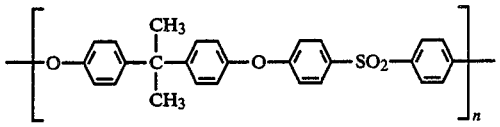

(UDEL P1700 obtained from Amoco Performance Products, Inc.) in a Brabender Plasticorder mixer at 360° C. for about 5 minutes. The blend was molded and tested as in Control A. The results are shown in Table I. The blend is immiscible as evidenced by its two Tg's. Again, the HDT remains the same, while there is a considerable increase in the melt-flow value of the blend.

TABLE I

| | Control A | Example 1 | Control B | Example 2 |
|---|---|---|---|---|
| Melt Flow Index @ 380° C. | 0.61* | 1.38* | 11.6** | 26.3** |

TABLE I-continued

|  | Control A | Example 1 | Control B | Example 2 |
|---|---|---|---|---|
| (g/10 min) |  |  |  |  |
| Tg (°C.) | 255 | 250,180 | 285 | 285,180 |
| HDT (°C.) | 240 | 240 | 275 | 275 |

*measured at 44 psi.
**measured at 440 psi.

What is claimed is:

1. A poly(aryl ether sulfone) compositon having improved flow properties comprising a blend of (a) from about 80 to about 99 percent by weight of a poly(aryl ether sulfone) having a second order glass transition temperature (Tg) higher than about 230° C., which consists essentially of units of the formula:

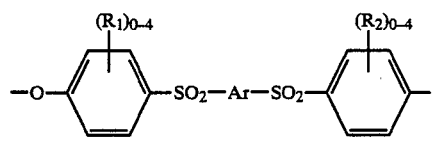

wherein Ar is selected from the group of:

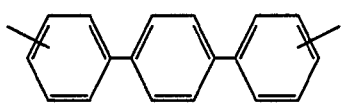

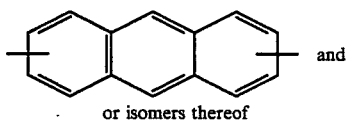

or isomers thereof

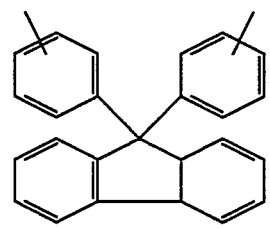

and $R_1$ and $R_2$ are $C_1$ to $C_4$ alkyl or alkoxy groups and can be the same or different, and (b) from about 1 to about 20 percent by weight of a second poly(aryl ether sulfone) having a Tg below about 230° C., which poly(aryl ether sulphone) is prepared by the nucleophilic polycondensation reaction of:

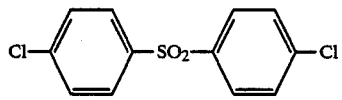

with bisphenols of the formula:

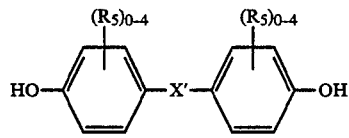

wherein X' is selected from the group consisting of alkylene and alkylidene radicals having up to and inclusive eight carbon atoms, cyclo-alkylene and cycloalkylidene radicals having up to and inclusive nine carbon atoms, S, CO, and the radicals:

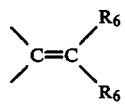

the $R_5$'s are hydrogen or $C_1$ to $C_4$ alkyl or alkoxy radicals or halogen atoms and can be the same or different; the $R_6$'s are hydrogen or $C_1$ to $C_4$ alkyl radicals or halogen atoms and can be the same or different.

2. A composition as defined in claim 1 wherein the poly(aryl ether sulfone) having a Tg higher than about 230° C. contains at least 50 mole percent of units of formula

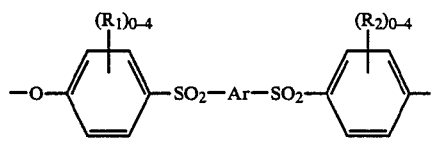

wherein Ar is selected from the group of

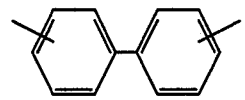

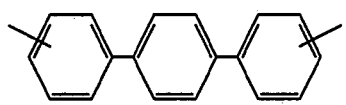

or isomers thereof

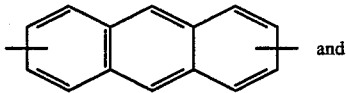

or isomers thereof

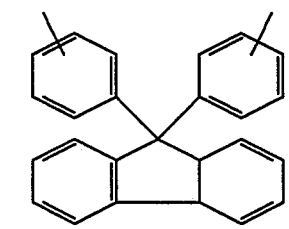

and $R_1$ and $R_2$ are $C_1$ to $C_4$ alkyl or alkoxy groups and can be the same or different.

3. A composition as defined in claims 1 or 2 wherein the poly(aryl ether sulfone) having a Tg higher than about 230° C. is prepared by the nucleophilic polycondensation of the dihalo-compound of formula

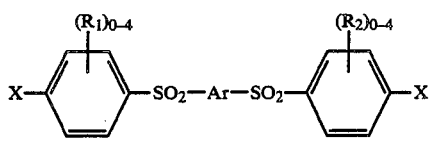

with the diphenol of formula

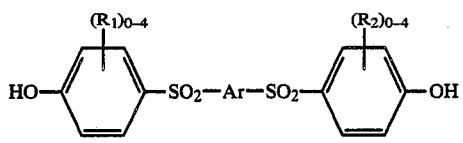

wherein X" is a halogen and Ar, $R_1$ and $R_2$ are as previously defined, and/or with any other dihydric phenol or mixture of dihydric phenols.

4. A composition as defined in claims 1 or 2 wherein the poly(aryl ether sulfone) having a Tg higher than about 230° C. is prepared by the nucleophilic polycondensation of the diphenol of formula

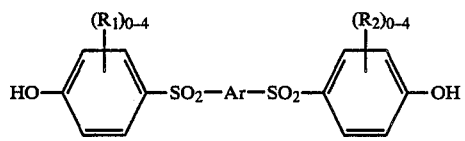

wherein Ar, $R_1$ and $R_2$ are as previously defined, with an activated dihalobenzenoid or dinitrobenzenoid compound or mixtures of these compounds.

5. A composition as defined in claims 1 or 2 wherein the poly(aryl ether sulfone) having a Tg higher than about 230° C. is prepared by the base catalyzed self-condensation of the halophenol of formula

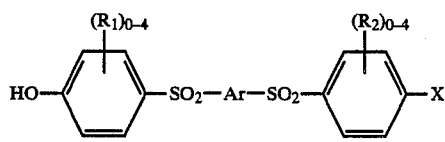

wherein Ar, $R_1$, $R_2$ and X" are as previously defined, optionally in the presence of a dihydric phenol and an activated dihalo- or dinitrobenzenoid compound.

6. A composition as defined in claims 3 or 5 wherein the dihydric phenol is selected from the group of

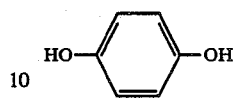

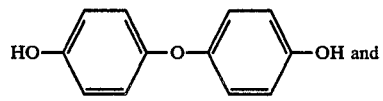

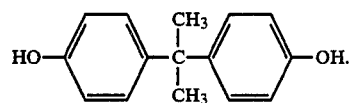

7. A composition as defined in claims 1, or 2, or 3, or 6, wherein the poly(aryl ether sulfone) having a Tg higher than about 230° C. is a random terpolymer of the following structure:

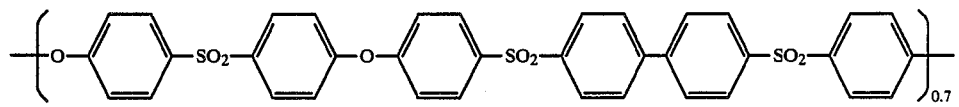

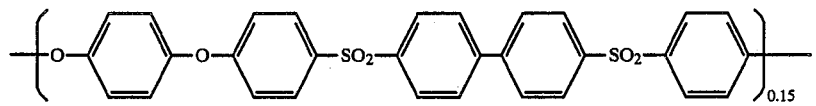

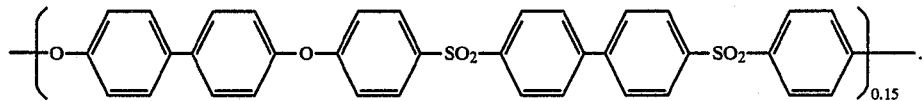

8. A composition as defined in claims 1 or 2 wherein the poly(aryl ether sulfone) having a Tg higher than about 230° C. is prepared by the electrophilic process.

9. A composition as defined in claims 1, or 2, or 8, wherein the poly(aryl ether sulfone) having a Tg higher than about 230° C. is a random copolymer having the structure:

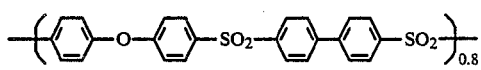

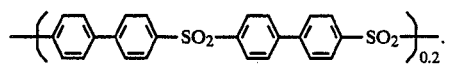

10. A composition according to claim 1 wherein the poly(aryl ether sulfone) having a Tg below about 230° C. is of the structure:
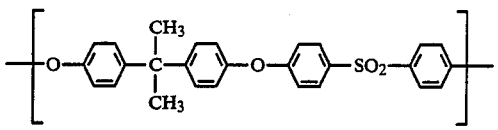
* * * * *

UNITED STATES PATENT OFFICE
CERTIFICATE OF CORRECTION

Patent No. 4,818,803               Dated   April 4, 1989

Inventor(s)    JAMES E. HARRIS

It is certified that error appears in the above-identified patent and that said Letters Patent is hereby corrected as shown below:

| Patent Column | Line | | |
|---|---|---|---|
| 5 | between lines 60-61 | " " (not in patent-please insert) should read --2,2-bis-(2-isopropyl-4-hydroxyphenyl)propane,-- | |
| 5 | 67 | "1,1;1,2;3,3," should read --1,1;1,3;3,3,-- | |

Signed and Sealed this

Tenth Day of October, 1989

Attest:

DONALD J. QUIGG

Attesting Officer

Commissioner of Patents and Trademarks